No. 631,276.  
J. BULOVA.  
BICYCLE CRANK.  
(Application filed Mar. 29, 1898.)  
(No Model.)  
Patented Aug. 22, 1899.
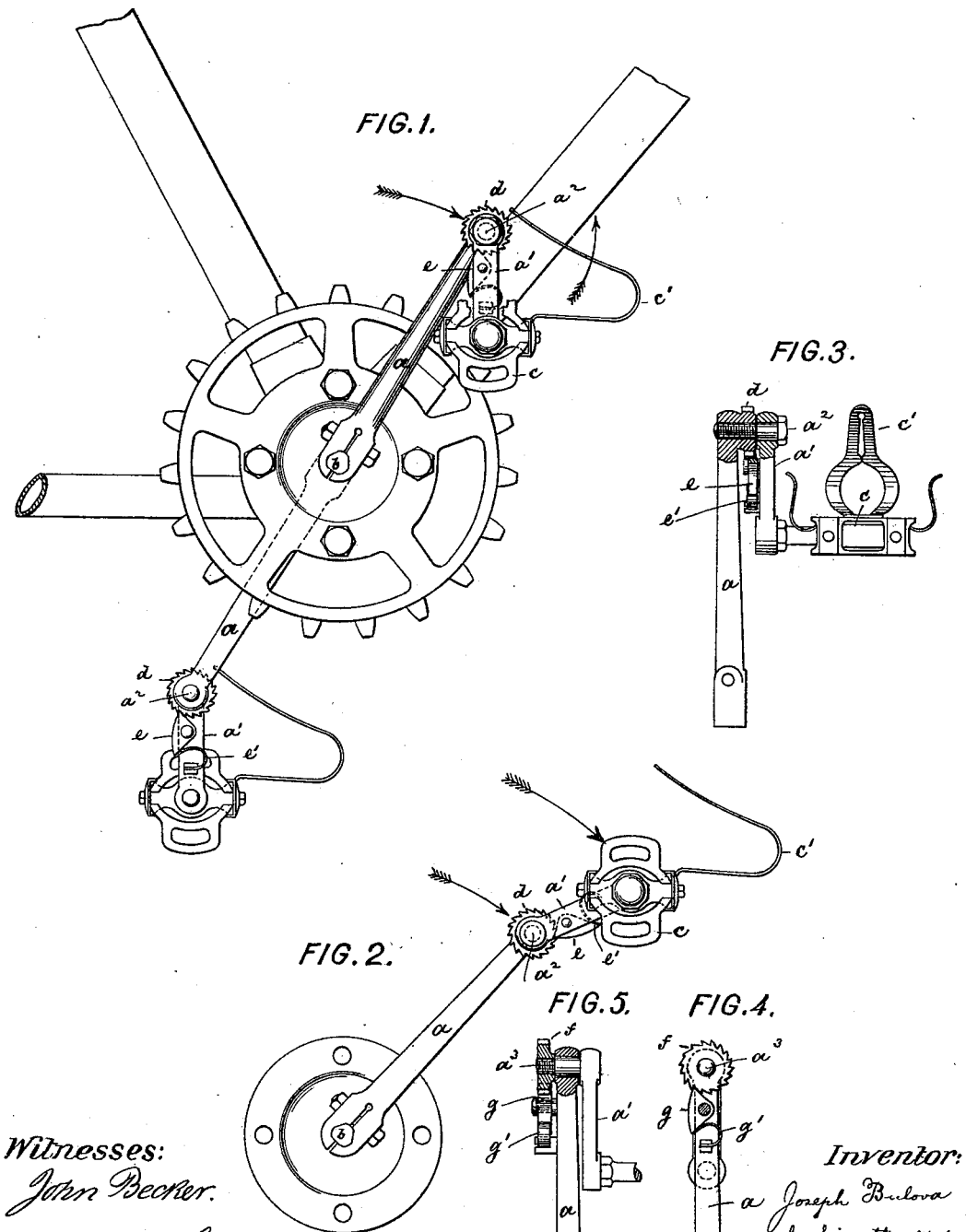
Witnesses:
John Becker.
William Schulz.
Inventor:
Joseph Bulova
by his attorneys
Roeder & Br...

UNITED STATES PATENT OFFICE.

JOSEPH BULOVA, OF NEW YORK, N. Y.

BICYCLE-CRANK.

SPECIFICATION forming part of Letters Patent No. 631,276, dated August 22, 1899.

Application filed March 29, 1898. Serial No. 675,529. (No model.)

*To all whom it may concern:*

Be it known that I, JOSEPH BULOVA, of New York city, county and State of New York, have invented an Improved Bicycle-Crank, of which the following is a specification.

This invention relates to a crank for bicycles which is so constructed that the leverage from the pedal may be increased to a greater or less extent during the downstroke, so that it is in the power of the rider to adjust such leverage according to the steepness of the grade to be overcome, while on level roads the normal leverage may be retained.

In the accompanying drawings, Figure 1 is a side elevation of my improved bicycle-crank; Fig. 2, an elevation of the right crank, showing it in a different position; Fig. 3, a rear view, partly in section, of the right pedal and crank; Fig. 4, an inner view of a modification of the crank; and Fig. 5, a rear view, partly in section, of the same.

The letter $a$ represents the crank-arm of a bicycle keyed, as usual, to the driving-shaft $b$. To the outer side of the free end of the arm $a$ is connected a freely-revoluble link $a'$ by a pivot $a^2$, which passes freely through the link $a'$ and is tapped into arm $a$. To the outer side of the free end of link $a'$ is in turn pivoted the pedal $c$, which may have a toe-clip $c'$, if desired. Thus it may be seen that the link $a'$ is revoluble around arm $a$, while the pedal $c$ is revoluble around the link $a'$ as well as around the arm $a$.

The parts $a$ $a'$ are adapted to be interlocked at different angles during the downstroke by a ratchet-wheel $d$, made integral with or secured to the outer side of arm $a$ around the pivot $a^2$, Fig. 3, such ratchet-wheel having a series of teeth on its forward edge, while the teeth on the rear edge may be omitted. The ratchet-wheel is engaged by a pawl $e$, influenced by a spring $e'$ and pivoted to the inner side of link $a'$. The ratchet-wheel $d$ is thus placed at the outer end of the arm $a$ concentric to the pivot, and its diameter is considerably less than the length of the arm itself, so that the inner end of the link $a'$ is freely rotatable around the outer end of arm $a$ and that the link will be carried up by the arm during the upstroke of the latter.

In use the link $a'$, with the pedal $c$, normally depends at $a^2$ from the arm $a$. When the upper pedal has been carried somewhat beyond its uppermost position (upper pedal, Fig. 1) and it is desired to increase the leverage, the foot is thrown out more or less, Fig. 2, in accordance with the increase of leverage desired. This throwing out of the foot will cause the link $a'$ to be likewise swung outward and the pawl $e'$ to be carried over a greater or less number of the teeth of the ratchet $d$ and to engage that one of the teeth with which it is ultimately in alinement. Thus it will be seen that a rigid connection between the parts $a$ $a'$ is established and that the length of the leverage represented by the distance of the pedal $c$ from the axle $b$ may be readily altered by the rider to conform to the road-grade, such leverage being readily changeable at every single downstroke. When the pedal has arrived somewhat back of its lowermost position, (lower pedal, Fig. 1,) the arm $a$ will be revolved by the descent of the other foot and the pawl will liberate the teeth of the ratchet-wheel, so that the link $a'$ will swing freely downward from pivot $a^2$. In this way the radius of revolution is again decreased, and this diminished radius is maintained until the pedal has again passed its uppermost position, when the foot may be again thrown outward to increase the stroke radius, as heretofore described.

On level roads or on downgrades where it is not desired to increase the stroke radius the foot is not thrust forward at the beginning of the downstroke, but the link $a'$ is permitted to depend vertically from pivot $a^2$, so that in this way no increase in leverage is produced.

Thus it will be seen that it is placed within the power of the rider to increase the leverage to any suitable extent, if he so desires, or to maintain the normal leverage, if that should be preferable.

In Figs. 4 and 5 the pawl-and-ratchet mechanism is not located between the parts $a$ and $a'$, but on the inner side of the part $a$. Here the pivot $a^3$ is rigidly connected to the link $a'$, but passes freely through arm $a$. On its inner end the pivot $a^3$ carries the ratchet-wheel $f$, that is thus revolved together with link $a'$, and is engaged by the pawl $g$, pivoted to the inner side of arm $a$ and influenced by spring $g'$.

What I claim is—

In a bicycle driving mechanism a crank-shaft, a crank of normal length secured thereto, a swinging link pivotally attached at the outer end of the crank, a pedal pivoted to the outer end of the link, and pawl-and-ratchet mechanism, between the crank and the link, to lock the link to the crank in the act of forward propulsion.

JOSEPH BULOVA.

Witnesses:
WILLIAM SCHULZ,
F. V. BRIESEN.